Aug. 9, 1927.

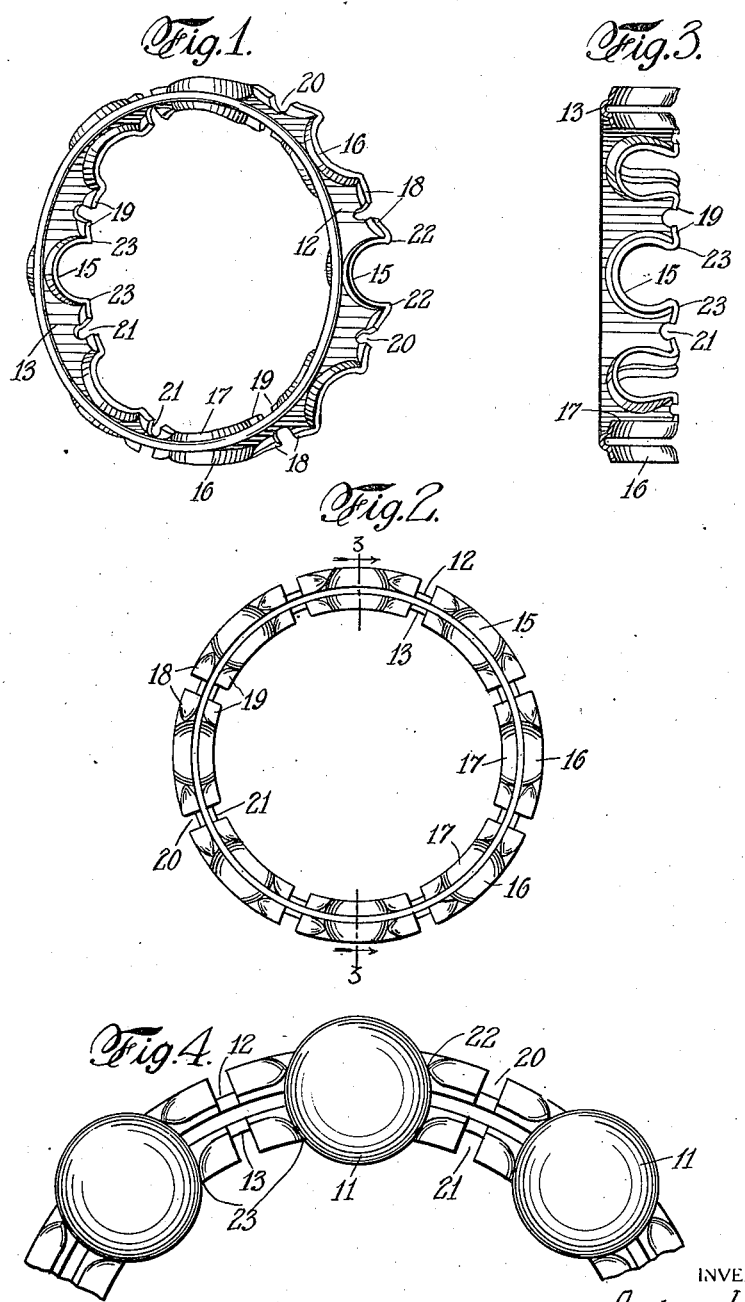

A. H. LINDE 1,638,538

CAGE FOR BALL BEARINGS

Filed Nov. 17, 1926

INVENTOR
Andrew H. Linde
BY
ATTORNEY

Patented Aug. 9, 1927.

1,638,538

UNITED STATES PATENT OFFICE.

ANDREW H. LINDE, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

CAGE FOR BALL BEARINGS.

Continuation of applications Serial No. 82,569, filed January 20, 1926, and Serial No. 121,511, filed July 10, 1926. This application filed November 17, 1926. Serial No. 148,782.

The object of this invention is to provide a specially designed cage or ball separator for use between the balls in an antifriction bearing in which the separator is applied to the balls after these are assembled in the race grooves between a pair of rings and equally spaced. The cage is particularly useful in connection with the two row deep groove radial type of bearing.

The preferred embodiment of the invention illustrated in the drawings is represented as drawn from sheet metal and presents two concentric substantially cylindrical rings or plates disposed face to face and connected at one edge, making a structure substantially U-shaped in cross section, although rather flattened. In the edges of the plates at the open or unconnected side of the structure there are formed open ball pockets. The depth of the pocket is somewhat more than half the ball diameter. During the forming operation the metal surrounding the recesses for the pockets and the free edges of the plates between the pockets is extruded in the form of flanges. The extrusion of metal from the outer plate is preferably projected outwardly and that from the inner plate projected inwardly, this being the most convenient method, particularly when the plates are pressed rather closely together. The width of the opening to the pocket is less than the diameter of the balls. To give the structure sufficient elasticity to snap over the balls, notches are formed in the edges of the plates between the pockets, these notches extending through the flanges. The notches in the portions between the mouths of the pockets impart compressibility to them, facilitating assembly by merely pressing the cage against the balls, which snap into position in the pockets. The edges of the flanges at the notches constitute engaging faces for a tool for spreading the metal on each side of the notch away from such notch, or rather, for closing up the flange upon the balls after the cages have been assembled.

In the drawings forming part of this application one practicable embodiment of the invention is illustrated, in which drawings Figure 1 shows in perspective a cage or separator formed in accordance with my invention, the view being taken from the closed side; this side being the one seen from the outside of the bearing when the separator is in its assembled position in a two row bearing.

Fig. 2 is an elevation of the separator viewed from the open side.

Fig. 3 is a central sectional view of the separator taken at about the plane of the line 3—3 Fig. 2.

Fig. 4 is an enlarged detail showing the manner of inserting the balls.

Figure 5:
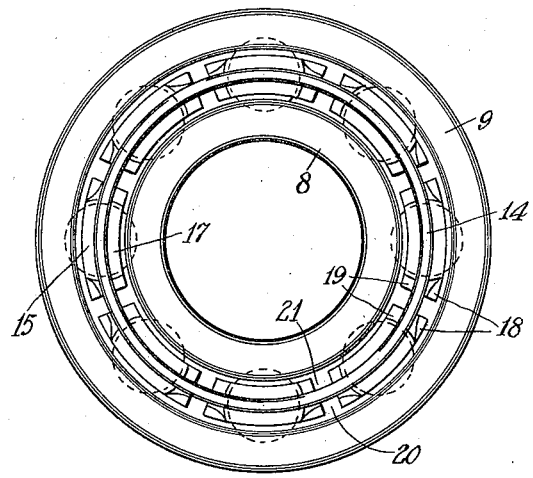
Fig. 5 is an elevation of a bearing equipped with the improved separator.

The bearing rings 8 and 9 shown by way of illustration herein are of the deep groove unnotched type, which are intended to be assembled with the two sets of balls, 10 and 11, by the Conrad or eccentric method. In this method of assembly as is well known the balls are placed between the rings in proper spaced position in the race grooves prior to the application of the cage or spacing device. When the cage of my present invention is assembled in a two row bearing of this type, the cage for each row is presented from the outside with the connected edges, 14, of the plates, 12 and 13, directed outwardly. Preferably the pockets are so proportioned that the balls snap in, the pockets then being closed or lapped about the balls in a manner presently to be described. According to the present invention the cage for each row of balls is formed of a single piece of sheet metal which upon being applied to the balls from the outside is secured in position by the pockets being closed or lapped about the balls. In a two row bearing of this type it is quite obvious that with the two rows of balls as closely related as they are in the showing in Figs. 6 and 7, which by the way, is substantially in proportion to the S. A. E. standard dimensions for wide series bearings; the separators must of necessity be applied from the outside and the structure must be such that the upsetting or deforming instrument, when one is used, can enter the space between the rings and pass through the narrowest space between the two adjacent balls before reaching its work.

In the illustration the separator is shown drawn from a single piece of sheet metal and forms two substantially cylindrical rings or plates, 12 and 13, united at one edge by a fold, 14. This fold, 14, is really the bottom or connecting member made by the drawing dies. A series of notches for affording ball pockets, 15, are formed in the free edges of the plates. The metal during the operation of forming these pockets is extruded into a flange directed away from the respective plates. When these plates are formed quite close together, as shown herein, the extruded metal is directed toward the outer faces of the plates. Or in other words, the flange, 16, from the outer plate is directed outwardly and the flange 17, from the inner plate is directed inwardly. The flanges upon the respective plates are shown extending entirely around each of the notches and forming part of the ball pockets, 15. The flanges also are continued upon the edges of the plates between the pockets at 18 and 19. Shallow notches, 20 and 21, are shown formed in the retainer severing the flanges between pocket mouths and entering for a suitable distance into the plates, 12 and 13.

The interruption of the edges of the plates and the flanges imparts compressibility to the structure between the mouths of the pockets, and also permits the lapping or folding of the outer edges or corners of the pockets about the balls by spreading or opening the notches, 20—21.

The depth of each pocket is preferably somewhat greater than half the diameter of the ball intended to be seated therein, and the curvature of the inner face of the pocket forming flanges, 16 and 17, is such that they extend above and below the great circle of the ball so that the cage will not permit a ball to either unduly depress or raise the cage, that is, the ball cannot ride over or under the cage.

The width of the mouth or opening to the pocket is less than the diameter of such ball, the corners 22—22 and 23—23 of the flanges being adapted to overlap the ball. Or, stated differently, the walls of the socket at any selected plane will be found to comprise a segment of more than 180 degrees, and the chord across the mouth at such selected plane to be less than the diameter of the circle of the intended ball on such plane.

Figure 6:
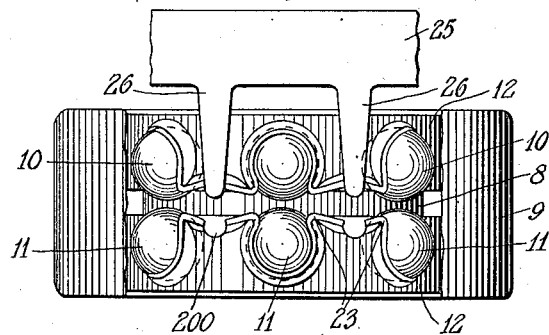
Figs. 6 and 7 are details showing the manner in which the separator may be tightly closed upon the balls in some instances.
Figure 7:
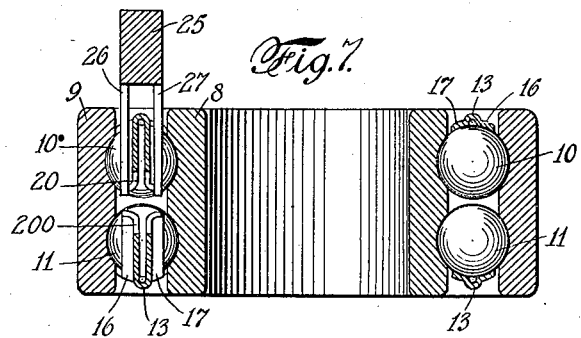

After the balls have been assembled between the rings, and properly spaced apart, the cage is brought into such a position that the corners 22—22 and 23—23 at the entrance of the various pockets engage the balls, whereupon inward pressure opens the mouths and closes the notches 20—21. The balls snap into position and the flanges at the outer edges or mouths may be then further lapped about the balls, the notches, 20—21, being spread apart and the flanges at the outer edges or mouths of the pockets lapped about the balls. In Figs. 6 and 7 is illustrated a convenient method for closing the cage upon the balls. A ring, 25, is shown provided with a series of fingers, 26 and 27, adapted to enter the space between the ball pockets and to straddle the plates, and by means of their wedge formation to enter between the interrupted ends of the flanges, 18—18 and 19—19 and spread the notches, moving the flanges and the metal of the plates supporting the same bodily into such a position that the flanges, 16, and 17, are lapped about the balls. During this spreading movement the angle of the corners formed by the flanges 16—18 and 17—19 is not changed.

The interruption in the plates and flanges between the ball pockets permits sufficient deformation to permit the pockets to open and receive the balls and then to close about the balls, and also permits of the notches being further opened and the ball pockets further closed by an operation which gives a permanent set to the structure.

This application is filed as a continuation of and in substitution for applications, Serial No. 82,569 filed by me on January 20th, 1926 and Serial No. 121,511 filed by me on July 10th, 1926.

It is to be understood that various changes in construction may be made within the scope of the claims without departing from the spirit of this invention.

Having described my invention I claim and desire to secure by Letters Patent:

1. A spacing cage for ball bearings comprising a flat body portion provided in its edge with open notches, and having flanges projecting outwardly from the edges of said notches laterally beyond the faces of the body portion and constituting conjointly sockets for holding the balls as an independent structure, the flanges being continued and extending along the edge of the body between sockets.

2. A spacing cage for ball bearings comprising a flat body portion provided in its edge with open notches, and having flanges projecting outwardly from the edges of said notches laterally beyond the faces of the body portion and constituting conjointly ball-holding sockets, the flanges being continued and extending along the edge of the body between sockets, the edges of the body portion and the extending flange being interrupted midway between sockets for affording spaces and engaging faces for a closing tool.

3. A spacing cage for ball bearings consisting of a folded body portion presenting two plates disposed face to face and provided at intervals in their edges with open notches, and having flanges extending outwardly from the notches laterally beyond the faces of the plates and constituting conjointly ball holding sockets, the flanges being continued and extending along the edges of the plates between sockets.

4. A spacing cage for ball bearings consisting of a folded body portion presenting two plates disposed face to face and provided at intervals in their free edges with open notches, and having flanges extending outwardly from the notches laterally beyond the faces of the plates and constituting conjointly ball holding sockets, the flanges being continued and extending along the edges of the plates between sockets, the edges of the plates and the extending flanges being interrupted midway between sockets for affording spaces and engaging faces for a closing tool.

5. A spacing cage for ball bearings consisting of a folded body portion presenting two plates disposed face to face and provided at intervals in their free edges with open notches, and having flanges extending outwardly from the notches laterally beyond the faces of the plates and constituting conjointly ball holding sockets, the flanges being continued and extending along the edges of the plates between sockets, the extending flanges being interrupted midway between sockets, the ends of the flanges at each interruption affording spaces and engaging faces at both sides open for the reception of a closing tool applied from the opposite edge simultaneously to both flanges.

6. A spacing cage for ball bearings consisting of a folded body portion presenting two plates disposed face to face, the plates being provided in their free edges with open notches and having flanges extending outwardly from the notches laterally beyond the faces of the plates and constituting conjointly ball holding sockets, the walls of the socket at any plane comprising a segment of more than 180 degrees and the open space for the mouth at such plane being less than the diameter of the intended ball thereat, the edges of the plates and the extending flanges being interrupted between the sockets for imparting compressibility and expansibility to the structure between the said mouths.

Signed at the city of Philadelphia, Pa. this 12th day of November, 1926.

ANDREW H. LINDE.